(12) United States Patent
Hradil et al.

(10) Patent No.: US 6,936,142 B2
(45) Date of Patent: Aug. 30, 2005

(54) SPOUTED BED APPARATUS FOR CONTACTING OBJECTS WITH A FLUID

(75) Inventors: George Hradil, P.O. Box 9650, Providence, RI (US) 09240-9560; Edward Hradil, Bradenton, FL (US)

(73) Assignee: George Hradil, Glocester, RI (US)

( * ) Notice: Subject to any disclaimer, the term of this patent is extended or adjusted under 35 U.S.C. 154(b) by 590 days.

(21) Appl. No.: 10/176,260

(22) Filed: Jun. 20, 2002

(65) Prior Publication Data

US 2002/0195333 A1 Dec. 26, 2002

Related U.S. Application Data

(63) Continuation of application No. PCT/US00/35413, filed on Dec. 28, 2000, which is a continuation-in-part of application No. 09/216,859, filed on Dec. 21, 1998, now Pat. No. 6,193,858.
(60) Provisional application No. 60/068,498, filed on Dec. 22, 1997.

(51) Int. Cl.[7] .............................................. C25D 17/00
(52) U.S. Cl. ..................... 204/222; 204/237; 204/240; 204/271; 204/275.1; 204/276; 204/277; 204/278; 118/303; 118/407; 118/417
(58) Field of Search ................................ 204/222, 237, 204/240, 271, 275, 276, 277, 278; 118/303, 407, 417

(56) References Cited

U.S. PATENT DOCUMENTS

| | | |
|---|---|---|
| 1,789,443 A | 1/1931 | Levin |
| 3,065,153 A | 11/1962 | Hough et al. |
| 3,241,520 A | 3/1966 | Wurster et al. |
| 3,654,098 A | 4/1972 | Backhurst et al. |
| 3,663,298 A | 5/1972 | McCoy et al. |
| 3,703,446 A | 11/1972 | Haycock et al. |
| 3,756,933 A | 9/1973 | Greenberg |
| 3,853,094 A | 12/1974 | Christini et al. |

(Continued)

OTHER PUBLICATIONS

The Annulus of a Spouted Bed as a Three–dimensional Electrode Hadzismajlovic, et al 1989 pp. 393–401.

*Primary Examiner*—Arun S. Phasge
(74) *Attorney, Agent, or Firm*—Townsend M. Belser, Jr.; Nexsen Pruet Adams Kleemeier, LLC

(57) ABSTRACT

A vessel for contacting a plurality of objects with a fluid. An upwardly directed stream of fluid and a portion of the objects are confined in a conduit such that the fluid stream causes the objects to flow upward from a moving bed thereof to a disengaging position from where they fall onto a distribution shield and move downward to a feed position. The vessel may be used for treating electrically conductive objects wherein the fluid is an electrolyte, an electrode is positioned to contact the moving bed, and a counterelectrode is positioned in spaced relation to the moving bed. The vessel may be fixed or portable.

38 Claims, 10 Drawing Sheets

U.S. PATENT DOCUMENTS

| | | |
|---|---|---|
| 3,880,116 A | 4/1975 | Prillig et al. |
| 3,945,892 A | 3/1976 | James et al. |
| 3,981,787 A | 9/1976 | James et al. |
| 3,994,796 A | 11/1976 | Mayer |
| 4,065,375 A | 12/1977 | Newton |
| 4,088,556 A | 5/1978 | Pellegri et al. |
| 4,090,927 A | 5/1978 | Fresnel et al. |
| 4,163,700 A | 8/1979 | Igarashi et al. |
| 4,171,249 A | 10/1979 | Newton et al. |
| 4,182,669 A | 1/1980 | Hojyo |
| 4,272,333 A | 6/1981 | Scott et al. |
| 4,278,521 A | 7/1981 | Kreysa |
| 4,292,144 A | 9/1981 | Lepetit et al. |
| 4,316,786 A | 2/1982 | Yu et al. |
| 4,330,386 A | 5/1982 | Korinek et al. |
| 4,337,135 A | 6/1982 | Quinton et al. |
| 4,640,746 A | 2/1987 | Nobel et al. |
| 4,681,670 A | 7/1987 | Nobel et al. |
| 4,769,117 A | 9/1988 | Shiono et al. |
| 4,822,468 A | 4/1989 | Kanehiro |
| 5,164,091 A | 11/1992 | Huber et al. |
| 5,203,979 A | 4/1993 | Uffinger et al. |
| 5,254,168 A | 10/1993 | Littman et al. |
| 5,487,824 A | 1/1996 | Griego |
| 5,565,079 A | 10/1996 | Griego |
| 5,635,051 A | 6/1997 | Salas-Morales et al. |
| 5,958,210 A | 9/1999 | Siu et al. |
| 6,193,858 B1 | 2/2001 | Hradil et al. |
| 6,287,450 B1 | 9/2001 | Hradil |

SPOUTED BED APPARATUS FOR CONTACTING OBJECTS WITH A FLUID

RELATED APPLICATIONS

This application claims the benefit of U.S. Provisional Application No. 60/068,498, filed Dec. 22, 1997, and is a Continuation of International Application No. PCT/US00/35413 filed Dec. 28, 2000 (filed and to be published in English), which was a Continuation-In-Part of U.S. Aplication Ser. No. 09/216,859 filed Dec. 21, 1998, now U.S. Pat. No. 6,193,858 issued Feb. 27, 2001, the entire contents of this patent and these prior applications being expressly incorporated herein by reference.

FIELD OF THE INVENTION

The invention relates to the use of spouted beds of particles, pieces, parts and other small objects for the treatment thereof in a liquid or gaseous fluid. The invention has particular application for the electroplating of small parts which are difficult to plate by conventional means. The invention also has application in the fields of wastewater treatment, electrowinning, electrochemical synthesis, anodic electrochemical smoothing, anodizing, electrophoretic polymer coating, and physical coating, as well as in the general field of spouted bed applications.

BACKGROUND OF THE INVENTION

Barrel plating, in which objects are tumbled in a perforated horizontal rotating drum, is a common method of electroplating small parts. Representative technology is disclosed in U.S. Pat. No. 4,822,468 by Kanehiro and U.S. Pat. No. 4,769,117 by Shino, et al. Many very small parts cannot be plated effectively in a barrel due to poor contact with the current feeder or fouling on the interior of the drum. These problems often necessitate the addition of plating media (typically some type of smooth metal shot) to the barrel to improve cathodic contacting and part motion. The use of media significantly increases the required plating time and current because the media is also plated and, therefore, the plating cost per part is increased. Additionally, many small parts are fragile or can interlock and may be damaged by tumbling with heavy media. Consequently, these parts cannot be plated successfully in barrels.

U.S. Pat. No. 5,487,824 by Greigo discloses and integrated electroplating system designed specifically to electroplate very small parts which employs a horizontal accelerating rotating drum to maintain a packed bed of parts in motion during electroplating.

U.S. Pat. No. 3,1124,098 by Backhurst et al. and U.S. Pat. No. 3,703,446 by Haycock et al. disclose fluidized bed cathodes. Although fluidized beds have excellent liquid-solid contacting, fluidized bed cathodes suffer from poor electrical contact between the fluidized particles, non-homogeneous electrical potentials and particle segregation effects. Additionally, it is difficult to maintain the entire bed fluidized when the particles are changing in size, and possibly density, due to metal deposition. It is unlikely that the potential benefits of the fluidized bed approach will be realized in a practical electrodeposition system.

Typical spouted beds consist of a cylindrical vessel with a conical bottom section. The vessel contains a bed of particles which form the spouted bed. Fluid is introduced into the spouted bed vessel at the bottom of the conical section as a jet. This fluid jet penetrates the bed of particles contained in the spouted bed vessel, entraining particles and forming a "spout" of upward moving particles and fluid. The particles disengage from the fluid flow in a region above the particle bed and then fall on top of the downward-moving annular bed. The "pumping action" provided by the spout circulates the particles through the vessel in a torroidal fashion; upwards in the spout and downwards in the annular moving bed. A "draft pipe" may be incorporated into the vessel to assist in the fluid transport of the particles. The draft pipe consists of a tube which is fixed coincident with the location of the spout, directly above and aligned with the liquid jet. The draft pipe delays the dispersion of the liquid jet and allows particle transport over a broader range of fluid velocities while also stabilizing the liquid flow.

U.S. Pat. No. 4,272,333 by Scott discloses the use of a moving bed electrode (MBE), in which conductive particles move downward vertically in a packed bed between two electrodes, the anode being shielded with a membrane. The necessity of using a membrane to shield the anode makes this configuration less attractive for practical applications, since the mechanical abrasion of the moving bed of particles can damage the membrane in a short time. Additionally, metal deposition on the membrane may be a complication.

An article by Hadzismajlovic et al. published in Hydrometallurgy, Vol. 22, pages 393–401 (1989), and U.S. Pat. No. 1,789,443 by Levin disclose the use of spouted bed cathodes with nodes suspended above the spouted bed surface. Although this configuration may eliminate the complication of shielding electrodes using membranes, several operational problems may be encountered with this configuration. Many electrolytes have poor electrical conductivity; therefore, it is advantageous to have the cathode and anode in close proximity in order to reduce the voltage drop over the cell. This cannot be accomplished in these prior art systems, since the spout would collide with the anode. Additionally, the projected spouted bed geometric surface area is very limited, impairing electrode performance.

Conventional spouted beds also suffer from a particle recirculation problem commonly referred to as "dead spots", where a portion of the particle bed is stagnant. Dead spots usually exist at the outer edge of the spouted bed surface and are attributable to a failure of the spout to deposit particles at the circumference of the spouted bed. In an attempt to remedy this problem, spouted beds with very steep bottom cone angles have been adopted. In all cases, the radius of the spouted bed has been strictly limited to the distance to which particles in the spout can be transported radially outward by the fluid flow.

SUMMARY OF THE INVENTION

In the present invention, a distribution shield consists of a solid conical section extending from the vicinity of the upper edge of a draft pipe downward and radially outward towards the vessel sidewall above or beyond the outer edge of a downwardly moving packed bed surface, and is used to convey parts, pieces, particles or other small objects to the outer edge of the spouted bed by preventing the objects from falling near the center of the spouted bed surface. Instead, the objects disengage from the spout and are deposited on the upper surface of the distribution shield. The objects then move along the top surface of the distribution shield until they are deposited at or beyond the outside edge of the moving bed surface.

Use of the distribution shield totally eliminates stagnant areas at the circumference of the spouted bed. Moreover, the distribution shield allows very large diameter spouted beds to be constructed at modest fluid flow rates, since it is no longer necessary to transport objects to the spouted bed circumference dynamically via the fluid flow. Additionally, when a distribution shield is used, large diameter shallow spouted beds with shallow bottom cone angles may be employed. In this type of bed, the motion of the objects is more radially inward rather than downward. This type of spouted bed is particularly advantageous for circulating fragile objects where the weight of a deep bed may crush or break the objects and is particularly useful for spouted beds of conductive or partially conductive parts used as high performance electrodes where large projected areas and shallow bed depths are desirable.

A portable electroplating apparatus, which incorporates a pump and a vessel which defines a spouted bed electrolytic reaction chamber, is also provided by the present invention. The portable electroplating vessel can be conveyed from process tank to process tank by hand, automated plating system, or hoist. The spouted bed vessel is mounted on a platform with a pump to provide the necessary electrolyte flow for the spouted bed chamber. It is advantageous to incorporate a liquid by pass circuit and adjustment valve so that the liquid flow to the spouted bed chamber can be adjusted. It is also desirable for the spouted bed vessel to be easily detachable from the portable apparatus and also for the internal components to be easily detachable from the vessel to facilitate access to the vessel interior.

In the practice of the present invention, conductive parts are electroplated while being circulated in a liquid spouted bed, in which the liquid is an electrolyte containing metal ions. The parts form a moving packed bed which is maintained under cathodic current by being in contact with a current feeder. The passage of current through the parts causes metal to be deposited from the electrolyte onto the parts as they circulate in the apparatus. Typically, the parts are retained in a non-conductive cylindrical vessel with a conical bottom section, although vessels with other geometries may also be used. The vessel may be made of a non-electrically conductive plastic material, for example polypropylene.

The electrolyte is introduced into the vessel as a jet at the bottom of a conical section into the bed of parts to be plated. The liquid jet entrains parts which disengage from the liquid flow in a region above the moving bed and then move radially inward and downward as a moving packed bed of parts. The action provided by the liquid jet thus circulates the parts through the vessel; first upwards and radially outward in the jet and then downward and radially inward in the packed bed.

The cathodic connection is made with the packed bed via metallic contacts or a current feeder attached to the inside of the conical section, or inserted into the packed bed from above. If the surfaces of the parts to be plated are entirely conductive, the current feeder may be small in size with respect to the particle bed. If the parts are partially conductive by having non-conductive elements, as is the case with surface mounted electronic components, it is desirable to employ current feeders with a much larger surface area to insure that electrical contact is made with the conductive portions of the parts during their movement in the moving bed. For example, a majority of the surface of the bottom conical section may be lined with a conductive material and used as a current feeder. The counterelectrode (anode) maybe suspended above the moving packed bed in the spouted bed chamber, or may be external to the vessel defining the spouted bed chamber.

The invention also may use a current feeder with a bumpy or otherwise textured surface to facilitate movement of the objects and to prevent the objects from sticking to the current feeder during electrodeposition. Bumps about the size of the objects are particularly useful for preventing rectangularly shaped objects from jamming together and "tiling" as they slide over the current feeder. Moreover, a bumpy or otherwise textured current feeder surface reduces the contact area between the objects and the current feeder, thereby decreasing the possibility that the objects will become fused to the current feeder during electroplating.

It is preferable to incorporate a "draft pipe" into the vessel to assist in the hydraulic transport of the parts. The draft pipe consists of a tube which is fixed coincident with the location of the spout, directly above and aligned with the liquid jet. The draft pipe delays dispersion of the liquid jet and allows part transport over a broader range of liquid velocities.

Additionally, it is preferable to employ a parts deflector located above the draft pipe. The parts deflector is a conical point or a flat disk or a downwardly facing concave surface which is located above the spout. The reflector prevents the parts in the spout from exiting the chamber and directs the part trajectories toward the sidewall of the vessel. It also prevents the jet of entrained parts from colliding with any overhead components in the chamber. The parts deflector is particularly advantageous in conjunction with the draft pipe, since the presence of the draft pipe strengthens the flow of the spout.

It is also preferred to employ a distribution shield. The distribution shield may be conical and extends from the vicinity of the upper edge of the draft pipe to above the outer edge of the inclined bottom wall of the vessel. This shield aids in distributing the parts to the outer edge of the spouted bed by preventing parts from falling near the center of the reaction chamber. Instead, these parts move along the top surface of the shield until they are deposited at the outside edge of the moving bed of parts.

In the present invention, the counter electrode, which is typically the anode, may be located inside the spouted bed vessel above the moving packed bed of parts, either under the distribution shield, or above the particle deflector. Alternately, external counter electrodes may be used, i.e., electrodes that are external to the spouted bed vessel. In the case of external counter electrodes, the counter electrodes are located in proximity to the spouted bed vessel which is at least partially immersed in the electrolyte. Openings are provided in the immersed portion of the sidewall(s) and/or bottom wall(s) of the spouted bed vessel to allow the passage of current via the electrolyte from the external counter electrodes to the moving packed bed of objects contained in the spouted bed vessel. The submerged vessel openings may be covered by a mesh, cloth or membrane which allows the passage of electrical current and prevents the loss of the objects from the spouted bed vessel. These openings may also serve as means for the electrolyte to enter and exit the spouted bed vessel.

Typically, external soluble anodes comprised of the same metal as is dissolved in the electrolyte are desirable in electroplating applications where the spouted bed vessel is conveyed between a plurality of processing tanks. On the other hand, an internal insoluble anode is desirable in stationary electroplating applications and in electrowinning. The present invention may also be practiced using rectangular vessels with slanted bottoms. In this case, the distribution shield would be an angled flat plate or plates, and the draft pipe and inlet pipe may be either tubular or rectangular.

The liquid electrolyte is injected into the reaction chamber via a pump and, during operation, this arrangement presents no difficulties. However, when operation of the device is interrupted, the parts from the bed may fall into the outlet of the pump via gravity, effectively fouling the pump. Therefore, a means of retaining the parts in the vessel is provided. One approach is to incorporate a screen at the jet inlet which will not allow the parts to pass. If a screen is used, it is preferable to filter the fluid upstream of the screen to prevent fouling. An alternate approach is to utilize a solid "trap" arrangement. This can be a simple "U" pipe on the inlet line, or can consist of two concentric pipes which cause the liquid to reverse direction. In either case, the parts are trapped due to their density difference with respect to the electrolyte. An access port can be incorporated into the trap to allow the parts to be conveniently removed from the spouted bed chamber.

The present invention also contemplates that the spouted bed vessel may be used in a stationary configuration in which the various cleaning, plating and rinse solutions are sequentially introduced from separate holding tanks, circulated through the reaction chamber for the appropriate time, and then purged from the spouted bed vessel via a manifold piping system connected to solution reservoirs, control valves, control system and pumps.

BRIEF DESCRIPTION OF THE DRAWINGS

The invention and its assembly and operation may be further understood from the following description of the preferred practices thereof, which are shown by way of example in the accompanying drawings wherein.

DETAILED DESCRIPTION OF PREFERRED EMBODIMENTS

Figure 1:
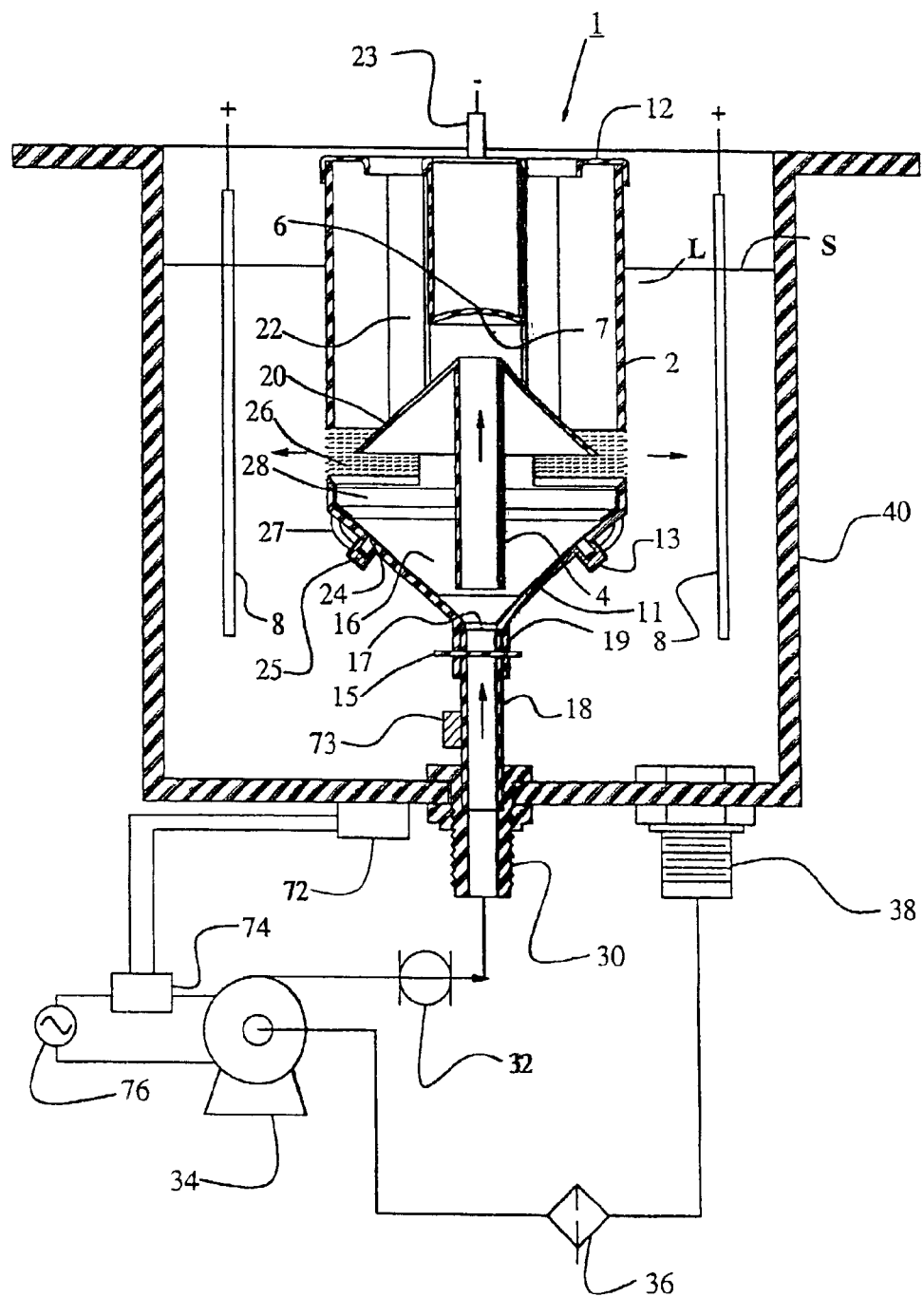
FIG. 1 is a cross-sectional elevational view of a portable spouted bed electrochemical reactor vessel and a stationary electrolyte tank and docking system made in accordance with the present invention.

Turning now in greater detail to the appended drawings, FIG. 1 shows a detailed cross-sectional view of a portable spouted bed reaction chamber or reactor 1, removably situated in a stationary process tank 40. The stationary process tank 40 is equipped with a pumping system to supply a liquid stream of electrolyte to spouted bed chamber 1, and is further equipped with stationary electrodes 8, which are external to the chamber 1 and function as counter electrodes to the objects contained in chamber 1. When electroplating objects, electrodes 8 function as anodes. The contained objects may be the same as objects 124 in FIG. 5, but these objects have been omitted from FIG. 1 for clarity. Tank 40 may be one of a series of process tanks between which portable spouted bed chamber 1 is conveyed during an electroplating process that will circulate through chamber 1 successive processing solutions, such as cleaning, plating and rinsing solutions. As an alternative, chamber 1 (or chamber 1' in FIG. 2) may be fixed to tanks 40 and successive processing solutions passed through tank 40 from a plurality of process tanks as shown in FIG. 6.

The spouted bed chamber 1 consists of a cylindrical vessel 2 with a conical bottom 11 and a detachable top 12. Vessel 2 is made of a material, such as polyethylene, that is not electrically conductive. The spouted bed chamber 1 is partially immersed in the electrolyte contained in tank 40, as is indicated by liquid surface S. The electrolyte is injected into the chamber 1 by an external pump 34 via a ball flow regulating valve 32, a socketed fitting 30 and an inlet pipe 18 having an attached mesh screen 17. Pump 34 is connected in a closed loop that is completed by tank 40, a tank outlet fitting 38, a liquid strainer 36 and associated plumbing.

The portable spouted bed chamber 1 may be detachably connected to tank 40 by inserting inlet pipe 18 into socketed coupling 30 as shown in FIG. 1. The inlet pipe is connected to the spouted bed vessel 2 via socketed receptacle 19. Pin 15 is used to retain inlet pipe 18 in socketed receptacle 19. Mesh screen 17 is attached to the end of inlet pipe 18 and retains the treated objects in the vessel 2 when the liquid flow through the vessel is discontinued. Pin 15 and inlet pipe, 18 and attached mesh 17 can be easily removed to allow the unloading of objects from the bottom of vessel 2 of the spouted bed chamber 1.

Liquid enters vessel 2 via the inlet pipe 18 and forms a jet which entrains parts or objects that are fed below draft pipe 4. The liquid jet with entrained objects (not shown) moves through the draft pipe 4 and impinges on a deflector 6 having a downwardly facing concave surface 7. Deflector 6 directs the entrained objects radially outward and downward, thereby disengaging the objects from the liquid jet. The disengaged objects are deposited on the top surface of a distribution shield 20 where they move radially outward and downward until they slide off the outer edge of shield 20 and are deposited on the upper surface of a clamping ring 28 around the upper edge of the chamber bottom 11 where they move downward and radially inward in a moving packed bed towards the gap between the upper end of inlet pipe 18 and the lower end of draft pipe 4.

The distribution shield 20 is attached to the chamber top 12 via vertical supports 22. The chamber top 12, supports 22, distribution shield 20, deflector 6 and draft pipe 4 form a detachable assembly which is readily removed by lifting the chamber top 12 from the spouted bed vessel 2, thus providing internal access to vessel 2. A small hole (not shown) may be provided in a top portion of the draft pipe adjacent the shield to vent any cathode gases from under the shield to the moving liquid stream in the draft pipe.

Electrical contact with the moving bed of objects is made by a conical current feeder 16 that is electrically conductive and lines the conical vessel bottom wall 11. Current feeder 16 is connected to an external electrical power supply by a cathodic connection comprising an electrically conductive cylindrical plunger 10 that penetrates the chamber bottom wall 11 and makes sliding contact with a current feeder block 25 having a cylindrical socket for receiving a lower portion of plunger 10 and a coil spring 9, as shown in greater detail in the enlarged view of FIG. 7. Spring element 9 is situated below plunger 10 and provides resilient pressure to maintain positive electrical contact between the upper face of plunger 10 and the bottom surface of current feeder 16. Current feeder block 25 is insulated by a polymeric layer or covering 13, and is connected to a cathodic connector 23 by an insulated conductor 27. As an alternative, current feeder 16 may be connected to the external power supply by contact with a countersunk flat head bolt (not shown), which penetrates the bottom wall 11 and is threaded into the insulated metal connecting block 25 to thereby affix it to the bottom wall.

Current feeder 16 may be a conical metal sheet held in place by a clamping ring 28, which is made of an electrically insulating material and prevents the treated objects from fouling on the outside edge of the current feeder 16. Current feeder 16 instead may be a metal layer coated or deposited onto the bottom wall 11. The upper (outer) surface of current feeder 16 may have bumps, or be roughened or otherwise textured to facilitate movement of the objects thereover.

Figure 7:
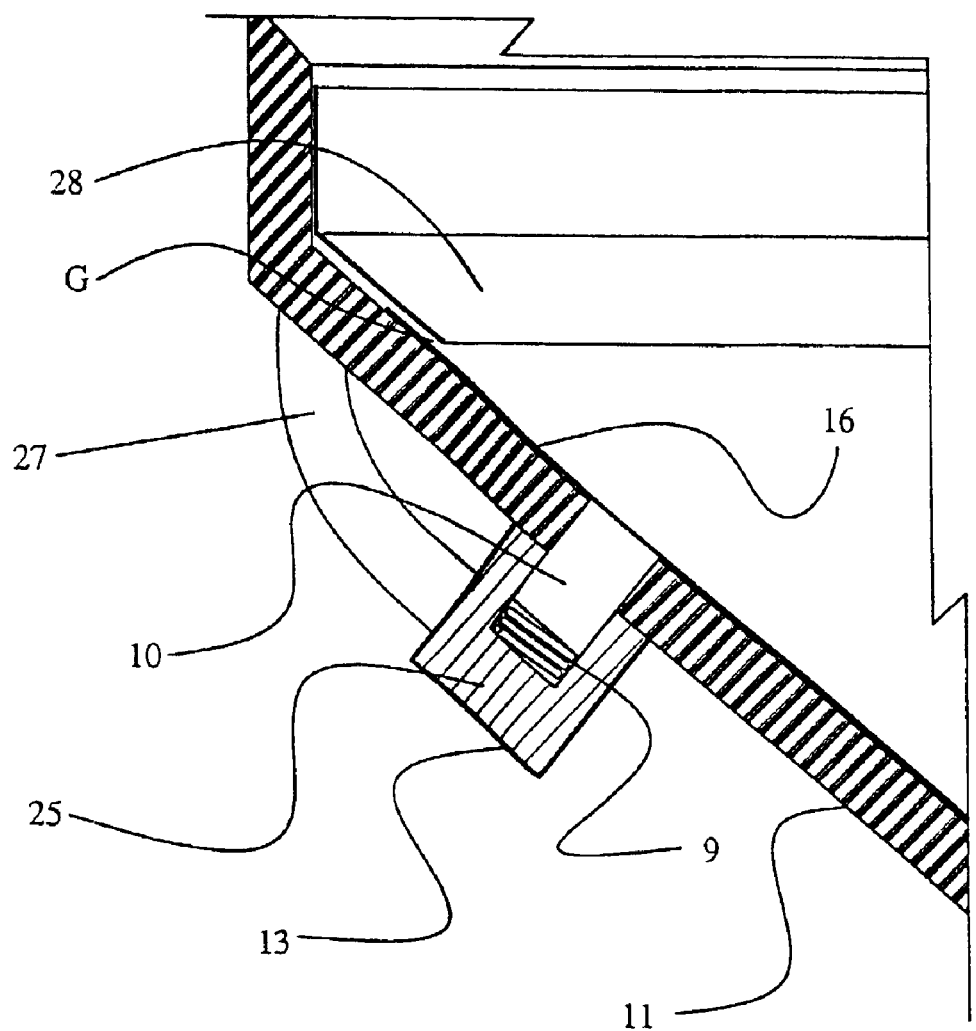
FIG. 7 is an enlarged fragmentary sectional view of a detail of the invention shown in FIG. 1.

FIG. 7 also shows that a gap G may be provided between the bottom surface of clamping ring 28 and the upper surface of current feeder 16. Gap G is preferably from about 0.2 to 1.0 mm and should be smaller than the parts being plated. Gap G dissipates a high current density area which tends to form at the insulated edge of a conductor that is under current in an electrolyte. Providing a gap lowers the current density in this area and inhibits nodular growth of deposited metal at the intersection of the lower edge of ring 28 and the upper surface of current feeder 16. This is particularly beneficial when electroplating partially conductive parts, such as surface mounted components. If a gap is not provided, nodular growth of metal deposited in this area can interfere with part recirculation.

It is also sometimes beneficial to extend clamping ring 28 further down to cover a greater portion of current feeder 16 to help maintain particle movement if there is a tendency for plated parts to fuse to an upper portion of the current feeder. Insulating more of the upper portion of the feeder 16 by extending clamping ring 28 downward creates greater downward pressure on the parts in contact with the lower portion of the current feeder to maintain part movement. The optimum width of the clamping ring 28 can be determined by a few trial runs and will depend on the shape of the parts being plated, the load size and the plating electrolyte. On the other hand, increasing the width of clamping ring 28 will increase the voltage when plating partially conductive parts, since the active feeder surface area will be reduced. Therefore, it is desirable to use as narrow a clamping ring as possible while still maintaining adequate part motion.

In the embodiments shown in the drawings for coating objects with a metal constituent of the electrolyte, the electrodes in contact with the moving bed of objects are connected to the negative terminal of the power source and function as cathodes, and the counterelectrodes 8 mounted in the stationary tank 40 in proximity to vessel 2 are connected to the positive terminal of the power source and function as anodes. Current is conducted from the anodes to the moving objects via one or more openings 26 in the sidewall of vessel 2, these openings being covered by a porous mesh, cloth or membrane for retaining the objects within the vessel while passing the liquid. Thus, liquid exits the vessel 2 via the mesh openings 26.

Figure 2:
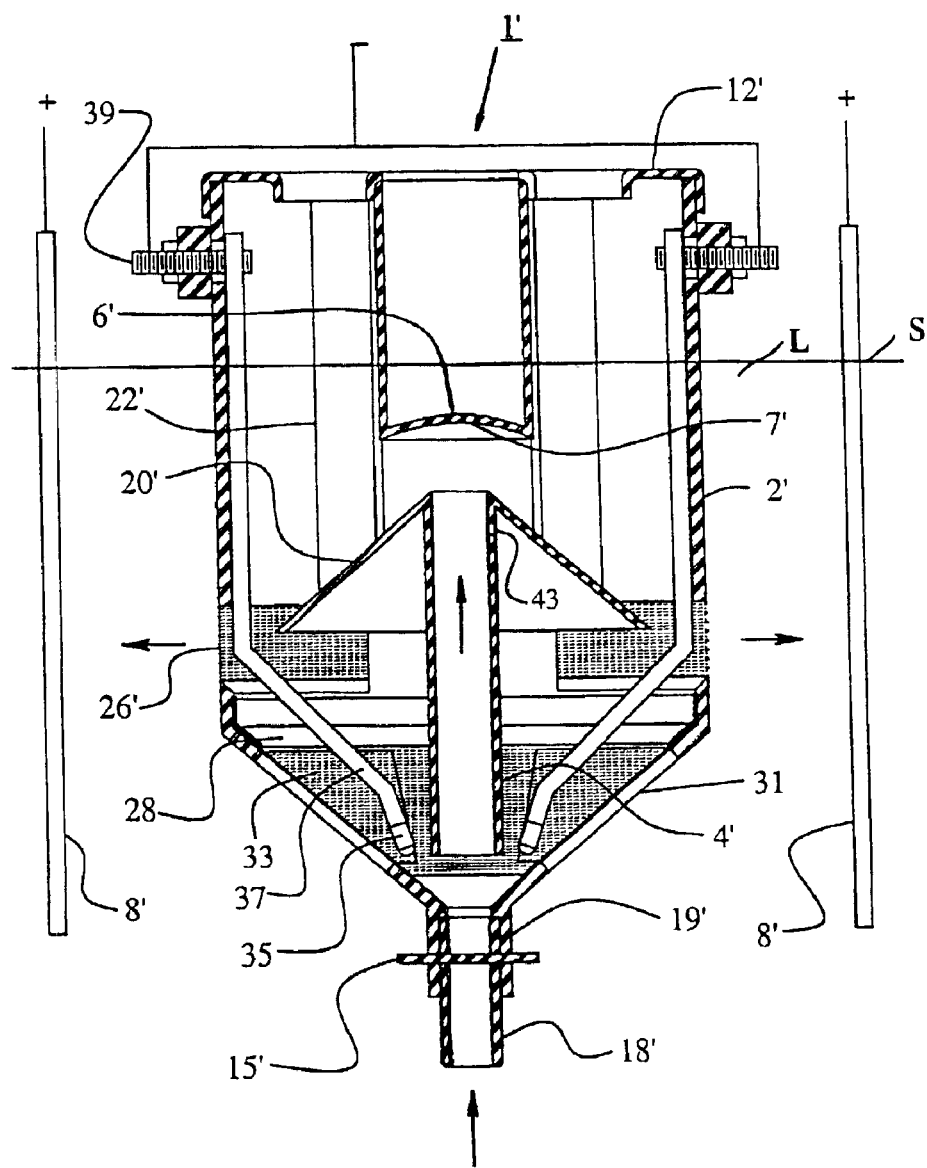
FIG. 2 is a cross-sectional elevational view of a modification of the portable spouted bed electrochemical reactor vessel of FIG. 1 wherein both bottom wall and sidewall openings are covered with mesh and current feeders are suspended from above the chamber bottom.
Figure 3:
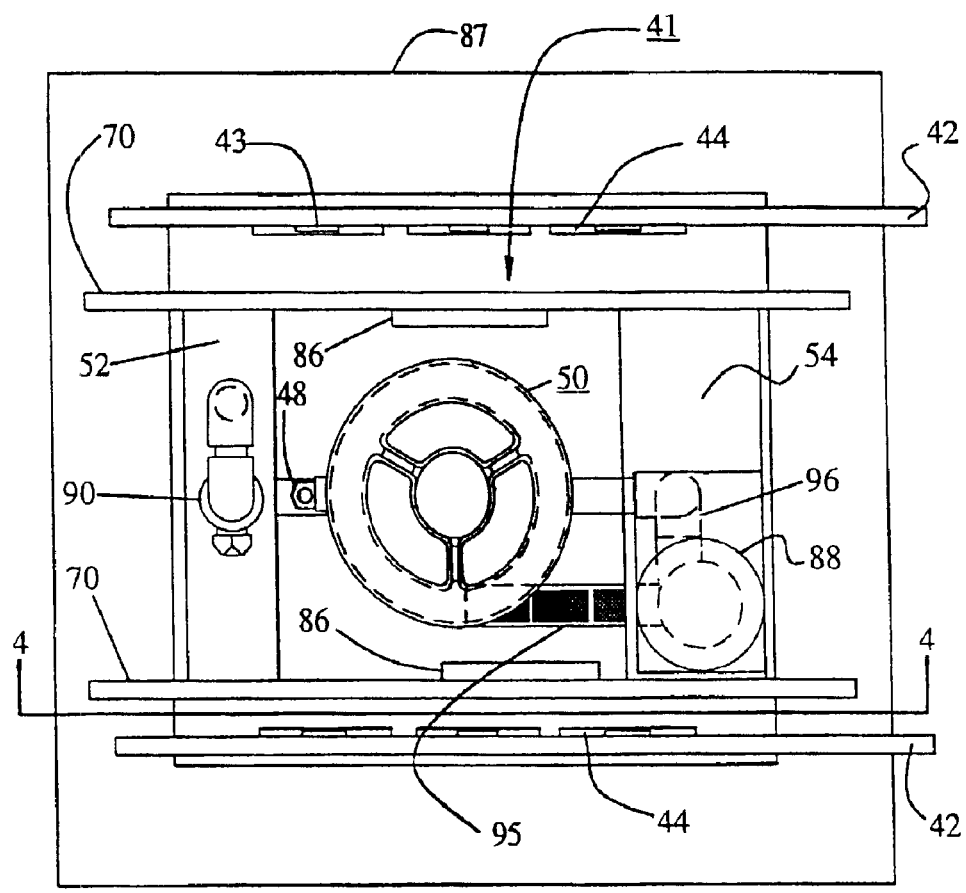
FIG. 3 is an exterior top view of a spouted bed plating apparatus as modified to provide a elf contained portable unit in accordance with the invention.
Figure 4:
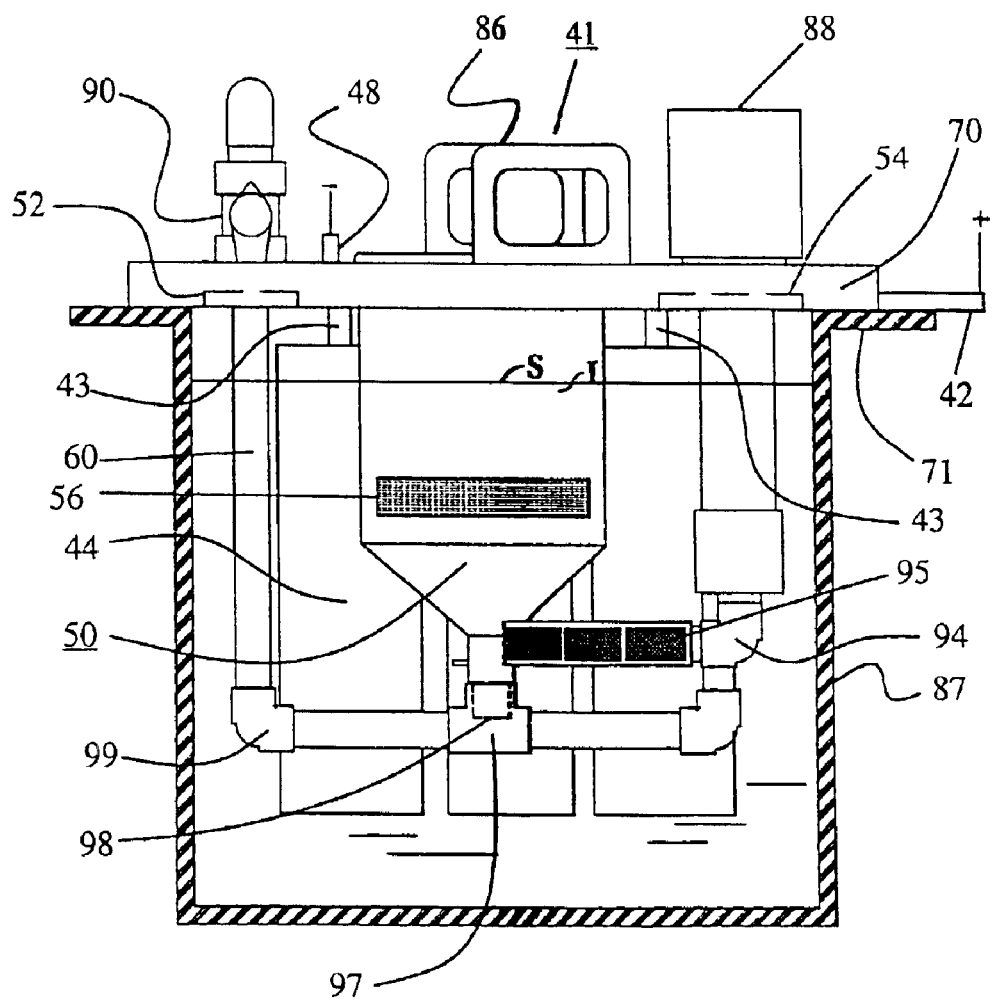
FIG. 4 is a cross-sectional elevational view of the apparatus of FIG. 3 as taken along line 4—4 of FIG. 3.

In implementing the embodiment of FIG. 1, as well as the embodiments of FIGS. 2–4, a pumping means and a docking means may be provided for each of a series of process tanks. An automated means for detecting the presence of a reactor vessel in each process tank may also be provided and used to automatically switch on the pump serving the tank. The detection means may be a physical contact switch (not shown) in the tank, or a magnetic hall effect sensor 72 on the outside of the tank and a magnet 73 attached to the inlet pipe 18 of the reactor vessel as shown in FIG. 1. The detection means may also include a relay module 74 responsive to inputs from sensor 72 to control the A.C. power supply 76 for operating the pump 43. In the embodiment of FIGS. 3 and 4, the sensor 72 could be located under the lip 71 in the vicinity of the position for a rail 70 and the magnet 73 attached to the corresponding rail. For such a physical or magnetic detection means, there may be substituted an optical detector, or any other means which can be effectively implemented to serve this purpose. Thus, it is an object of the present invention that the pump for each tank used with the embodiments of FIGS. 1–4 may be automatically activated when a reactor vessel is present and deactivated when the tank is empty.

FIG. 2 illustrates a spouted bed electrochemical reactor 1' similar to that depicted in FIG. 1 except that there are openings 31 in the vessel bottom wall and these openings are covered with a plastic mesh 33 to retain the circulated parts (not shown) within vessel 2'. Components that are essentially the same as those in FIG. 1 have the same numerical designations with the addition of a prime symbol (′). Cathodic contact is made with the moving bed of parts via conductive rods 35 that have an insulating sleeve 37 and are attached to the chamber sidewall an to electrical connectors via bolts 39. The conductive rods are coated or covered with the insulating sleeve 37 except for exposed tips which are in contact with the moving bed of parts. The circulation of parts in the apparatus of FIG. 2 is the same as that in the apparatus of FIG. 1. The mesh covered openings 31 in the bottom wall of the chamber allow a more direct current path between the cathodic moving bed of parts and the external anodes 8' than the apparatus in FIG. 1. which has sidewall openings only. This results in significantly reduced voltages during electroplating.

The openings 31 in the chamber bottom wall also enhance the draining of solution from the chamber vessel 2' after cleaning, electroplating and rinsing processes. On the other hand, the apparatus of FIG. 1 has a much greater current feeder surface area than that of FIG. 2. Therefore, the apparatus of FIG. 1 is more suitable for the electroplating of partially conductive parts such as surface mounted electrical components, whereas the apparatus of FIG. 2 is more suitable for the electroplating of metal parts or components. A small hole 43 may be provided in a top portion of the draft pipe 4' adjacent the shield 20' to vent any cathode gases from under the shield to the moving liquid stream in the draft pipe.

FIG. 3 shows a top view of a portable plating apparatus 41 having a spouted bed reactor vessel 50 removably situated in a process tank 87 containing a process solution L. This apparatus may be used in an analogous manner to a plating barrel or plating rack in that it is designed to be conveyed from tank to tank for circulating through vessel 50 successive processing solutions, such as cleaning, rinsing, and plating solutions.

FIG. 4 shows a sectional view of apparatus 41 taken along line 4—4 of FIG. 3. The lower portion of the apparatus is immersed below the surface S of the process solution L, and the entire apparatus is supported by side rails 70, 70, which rest on a sidewall lip 71 of each process tank 87 and are equipped with handles 86, 86. The apparatus includes transverse platforms 52 and 54, which connect the side rails 70, 70. A submersible head centrifugal pump 88 is mounted on platform 54. The inlet of the pump is attached via an elbow 94 to a liquid strainer 95. The outlet 96 of the pump is connected via a short segment of plastic pipe to a plastic T fitting 97.

The inlet pipe 98 of the spouted bed vessel 50 is detachably coupled to the T fitting 97. The third opening of the T fitting 97 is attached via a plastic pipe and elbow 99 and a plastic pipe 60 to a bypass ball valve 90. The outlet of ball valve 90 returns solution to the process tank 87 via the segments of plastic pipe and elbows shown in FIGS. 3 and 4. The amount of solution circulated through the spouted bed vessel 50 can be adjusted by using the bypass valve 90. The spouted bed vessel 50 is open to the atmosphere and has mesh covered openings 56 in the lower chamber sidewall. Solution is returned to the process tank via the mesh enclosed openings 56.

The negative direct current electrical connection (cathode) to the circulated objects in vessel 50 is via an electrical connector 48 passing through the sidewall of vessel 50. The counter electrodes or anodes 44 are suspended in the process tank 87 in proximity to the vessel 50 by conductive connectors 43 carried by conductive support rods 42, which are connected to the positive terminal of a direct current power supply. Current passes between anodes 44 and the circulated objects contained in vessel 50 via openings 56 in vessel 50. The internal components of vessel 50 are identical to those illustrated in vessel 2 of FIG. 1.

Figure 5:
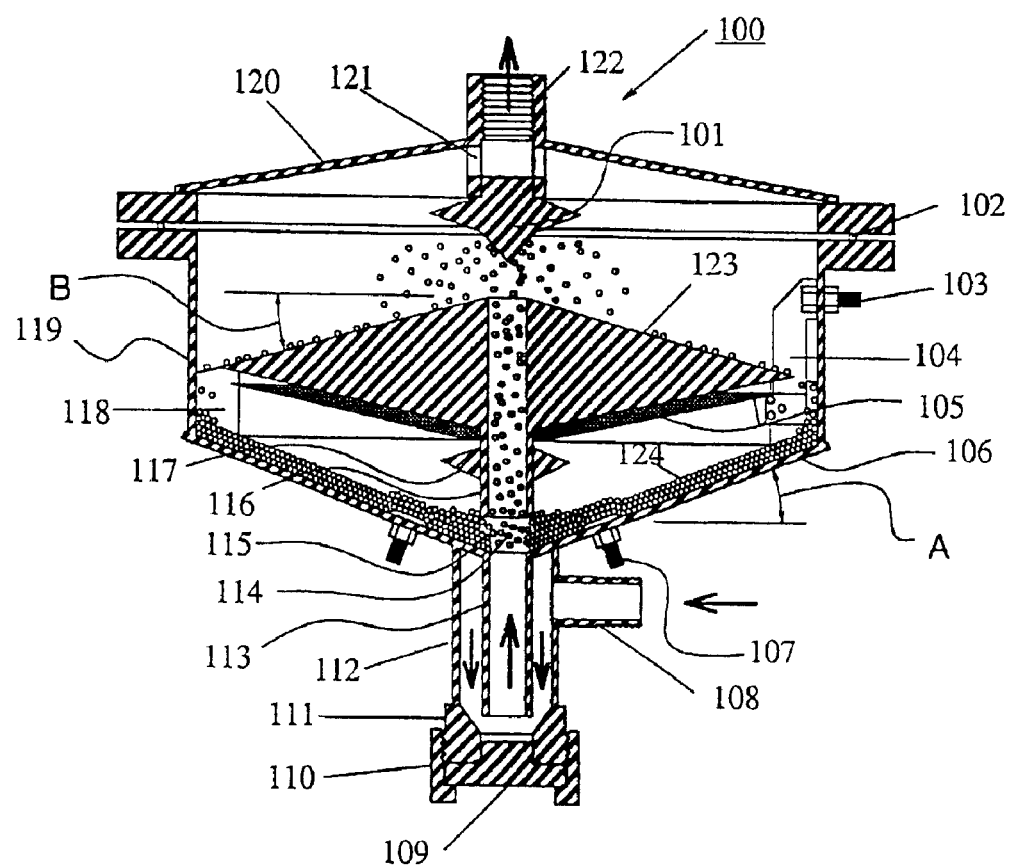
FIG. 5 is a cross-sectional elevational view of a modified spouted bed electrochemical reactor vessel having a shallow conical bottom and a concentric annular parts trap with a parts removal port.
Figure 6:
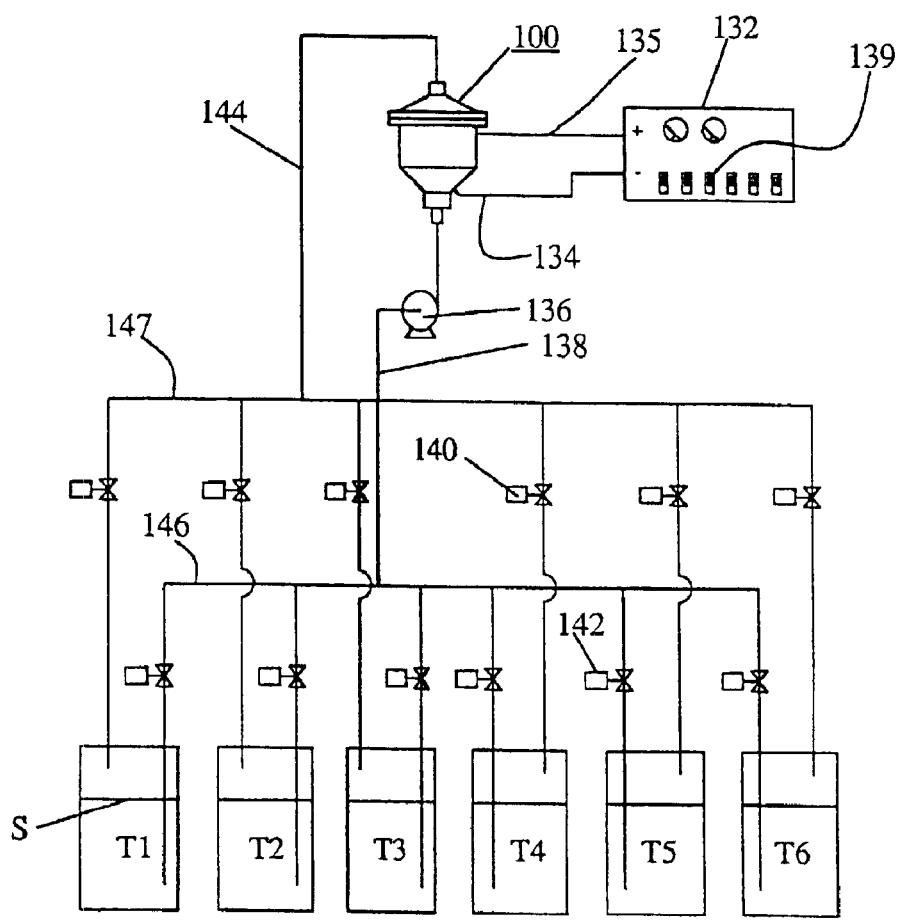
FIG. 6 is a diagrammatic illustration of a fluid system for providing multiple treatment solutions to a reactor of the type shown in FIG. 1, 2 or 5.

FIG. 5 shows a spouted bed electrochemical reactor 100 with a vessel 119 containing a draft pipe 116, object deflector 101 and distribution shield 123. The vessel 119 is cylindrical with a conical bottom 106 and a conical top 120. The liquid 5 electrolyte is injected into a chamber of the vessel through an objects trap consisting of an inner inlet pipe 113 and a concentric outer pipe 112. The outer pipe 112 has a threaded access port 111. The access port 111 is sealed by a cap 109 held in place by a threaded clamping ring 110. Liquid enters the annulus formed by concentric pipes 112 and 113 via a threaded pipe 108. Parts 113, 112, 111, 110, and 109 form the objects trap, which retains the objects 114 of the conductive bed 124 in the chamber when the liquid flow through the chamber is discontinued. The trap may also be used to discharge the coated objects from the chamber by removing cap 109 from the access port 111. Liquid enters the chamber via the inlet pipe 113 and forms a jet stream which entrains objects 114 as they are fed through a gap 115 below the draft pipe 116.

The liquid jet, with entrained objects, moves through the draft pipe and impinges on the deflector 101. The deflector 101 directs the entrained objects outward and disengages them from the liquid jet. The disengaged objects fall onto the distribution shield 123 and move radially outward until they are deposited at the outer edge of the bottom wall 106, where they move downward and radially inward towards the draft pipe 116 and gap 115 in a moving packed bed 124. The distribution shield 123 is mounted in the chamber via supports 118 resting on the chamber bottom wall 106. The angle A from the horizontal to the bottom wall 106, and the angle B from the horizontal to the upper surface of the distribution shield 123, are preferably in the range of 10° to 70°, more preferably in the range of 20° to 60°, and most preferably 20° to 50° for round objects and 35° to 60° for non-round objects.

Electrical contact with the bed 124 is made by flat head bolts 107 which penetrate the chamber bottom wall 106 and contact the moving bed of objects 124. The counterelectrode 105 is located under the particle distribution shield 123 and is connected to the external power supply (not shown) via a connector strip 104 and a bolt 103, which penetrates the sidewall of the vessel 119. The bottom surface of the distribution shield 123 is sloped upwards and radially outward so that evolved gases easily exit the chamber without being trapped under the shield. A deflector ring 117 mounted around the draft pipe 116 prevents objects from impinging against the counterelectrode 105. Liquid exits the spouted bed chamber via a threaded pipe fitting 122 having inlet apertures 121 and 10 attached to the conical cover 120, which seals the spouted bed vessel 119 via an O-ring 102. A conical cover facilitates the complete removal of gases evolved during electrolysis.

FIG. 6 shows a schematic diagram of an electroplating fluid system which incorporates a stationary spouted bed electrochemical reactor of type 100 of FIG. 5. Reactor 100 is connected via electrical cables 134 and 135 to a stationary power supply and control panel 132. Solutions for the electroplating process may include cleaners, acids, plating solutions and rinses contained respectively, in tanks T1 to T6. The objects to be plated are loaded into the spouted bed vessel 100. Then, solutions from tanks T1 to T6 are delivered separately to the spouted bed reactor 100 via inlet line 138, solenoid valves 142, inlet manifold 146 and pump 136. Solution exits the spouted bed reactor 100 via outlet line 144, outlet manifold 147 and solenoid valves 140.

During the electroplating process, the inlet and outlet solenoid valves to one process tank will be opened and the pump actuated to circulate the solution to and from the process tank in a closed loop. Each tank will be circulated in turn so that an electroplating process may be accomplished. The solenoid valves 140 and 142, power supply and control panel 132, and pump 136 may be actuated manually by switches 139 or may be computer controlled. At the end of the plating process, the plated objects are removed from vessel 100 and the process is repeated. Since only one inlet and outlet set of solenoid valves connected to process tanks T1 to T6 will be open at any time, remotely actuated, multi-port rotary selector valves may be substituted for separate solenoid valves 140 and 142.

EXAMPLES OF ELECTROPLATING

Example 1

A portable plating apparatus with a 7.5 inch diameter spouted bed chamber having a draft pipe and particle distribution shield was used to electroplate 2 mm long, 0.7 mm diameter, stamped copper connector clips. These clips cannot be easily electroplated in a barrel since they are very light and tend to interlock when tumbled with media. 50 ml of clips, comprising approximately 20,000 pieces, were loaded in the spouted bed chamber. This is the minimum load for this size apparatus. The apparatus was conveyed by hand between process tanks and was subjected to the following treatment sequence:

| 1. | Soak cleaner | 5 min | |
| 2. | Cathodic electrocleaner | 5 min | 6V, 6A |
| 3. | Water rinse | 3 min | |
| 4. | HCl (50%) Activator | 5 min | |
| 5. | Water rinse | 5 min | |
| 6. | Cyanide dip | 3 min | |
| 7. | Copper cyanide plating | 5 min | 6V, 8A |
| 8. | Dragout rinse | 1 min | |
| 9. | Water rinse | 3 min | |
| 10. | Sulfuric acid (5%) | 5 min | |
| 11. | Water rinse | 3 min | |
| 12. | Sulfamate nickel plating | 20 min | 6V, 8A |
| 13. | Water rinse | 3 min | |
| 14. | Sulfuric acid (5%) | 5 min | |
| 15. | Water rinse | 3 min | |
| 16. | Hard Gold Plating | 25 min | 6V, 6A |
| 17. | Dragout rinse | 3 min | |
| 18. | Water rinse | 3 min | |
| 19. | Hot DI water rinse | 3 min | |

A sampling of 10 clips was tested for nickel and gold deposit thickness by x-ray diffraction analysis. An average thickness of 124.9 micro inches of nickel was measured with a standard deviation of 18.0 micro inches. An average thickness of 32.7 micro inches of gold was measured with a standard deviation of 2.1 micro inches. No interlocking of the clips was observed.

Example 2

3 mm diameter flat sensor disks were electroplated using a portable plating apparatus with a 7.5 inch diameter spouted bed chamber equipped with a draft pipe and particle distribution shield. Disks were also electroplated in a conventional barrel plating apparatus as a means of comparison. The plating sequence given below was used for both trials:

| 1. | Soak cleaner | 5 min | |
| 2. | Cathodic electrocleaner | 5 min | 6V, 6A |
| 3. | Water rinse | 3 min | |
| 4. | HCl (50%) Activator | 5 min | |
| 5. | Water rinse | 5 min | |
| 6. | Cyanide dip | 3 min | |
| 7. | Copper cyanide plating | 5 min | 6V, 8A |
| 8. | Dragout rinse | 1 min | |
| 9. | Water rinse | 3 min | |
| 10. | Sulfuric acid (5%) | 5 min | |
| 11. | Water rinse | 3 min | |
| 12. | Sulfamate nickel plating | 20 min | 6V, 8A |
| 13. | Water rinse | 3 min | |
| 14. | Sulfuric acid (5%) | 5 min | |
| 15. | Water rinse | 3 min | |
| 16. | Hard Gold Plating Spout, versus Barrel | 222 min, 382 min, | 6V, 5A 6V, 15A |
| 17. | Dragout rinse | 3 min | |
| 18. | Water rinse | 3 min | |
| 19. | Hot DI water rinse | 3 min | |

The disks electroplated in the barrel required the addition of plating media (metal shot) to maintain proper cathodic contacting in the barrel. The volume ratio of media to plated parts was approximately 3 to 1. The parts and plating media were plated in the barrel using gold electrolyte at 6 V and 15 A for 6.36 hours to achieve an average thickness of 222.8 micro inches with a standard deviation of 12.0 micro inches.

The disks were plated in the spouted bed plating apparatus at 5A, 6V for 3.7 hours to achieve an average thickness of 220.1 micro inches with a standard deviation of 7.4 micro inches. The spouted bed apparatus not only deposited metal 42% faster than the barrel, but since no media was required, all the gold deposited was on the product parts, not the media. Thus, approximately five times more gold was required to plate the parts in the barrel than to plate the parts in the spouted bed apparatus.

Examples of: Electrowinning

The present invention is also suitable for electrowinning to recover metal values from process solutions, wastewaters, or mining leachants, and as a method of pollution prevention and wastewater treatment. Presently-employed technologies for treating metal-bearing aqueous waste streams, such as chemical precipitation and ion exchange, do not leave the metal in a form where it can be recycled economically. The need for toxic waste reduction and recycling of usable materials necessitates the development of technologies that will reduce the concentration of dissolved metal in waste streams and allow the recycling of the recovered metals.

The performance, cost, and maintenance requirements of conventional electrowinning systems make them economically attractive only for certain limited applications. The present invention is a significant improvement in this technology, as it will lower equipment cost, reduce maintenance requirements and improve performance, thereby making a much wider range of electrolytic recovery applications possible.

The operating goals for electrowinning are somewhat different than those for electroplating. In electroplating, the quality and uniformity of the deposit are of paramount concern, with the current efficiency being of secondary importance. In electrowinning, maximizing current efficiency and current density are the primary goals.

The present invention may be used for electrowinning by using conductive media as the spouted bed cathode. The media may consist of metal shot, cut wire shot, metallized glass spheres, or graphite or carbon spheres or granules. The use of spherical media is particularly advantageous since very shallow chamber bottom and distribution shield angles (angles A and B in FIG. 5) may be used while maintaining excellent bed movement. When metal shot or metallized glass spheres are used as the bed media, the metal is recovered in a valuable, easily recycled form.

In conventional electrowinning, flat electrodes (cathodes and anodes) are immersed in the solution to be treated. A potential is imposed between the electrodes and a direct current is passed through the solution. At the cathode, charged metal ions diffuse to the surface where they receive electrons from the cathode and are reduced to their metallic state. The metal can be present in the solution as a free metal cation or as a complex metal anion, for example, a cyanide complex. It should be noted that the primary mechanism transporting metal ions to the cathode is ordinary Fickian diffusion and is not electrical in nature.

At very low current densities, the rate of reduction at the cathode will be proportional to the current density (current per unit area of electrode). At higher current densities, however, the rate of metal reduction is limited by the rate of diffusion of the metal ions to the cathode surface. This puts a practical limit on the current density that can be effectively applied. The limiting current density can be calculated using Fick's first law for steady state diffusion, and invoking the Nernst assumption of a linear concentration variation in the diffusion layer. The equation for the diffusion-limited current density is:

$$\lambda_L = -DnFC/d$$

Where:
$\lambda_L$—Limiting current density
D—Diffusion coefficient of the metal ions
n—The charge of the metal ions
F—Faraday's number
C—Bulk liquid concentration of metal ions
d—Thickness of the Nernst diffusion layer The thickness of the Nernst metal ion depleted layer depends on the extent of agitation in the solution adjacent to the electrode. For a stationary solution, the thickness of the Nernst layer is about 0.05 cm. For an agitated solution, the thickness will be between 0.01 to 0.005 cm. The rate of diffusion of metal ions through the ion depleted layer will be linearly proportional to the concentration gradient in the layer. The metal concentration at the cathode surface can be assumed to be zero, so the concentration gradient will be the bulk metal ion concentration divided by the Nernst layer thickness. These two factors control what the limiting current density will be on a flat cathode.

As an example, the limiting current for recovery of silver from a 1000 ppm silver cyanide solution with moderate agitation is approximately 0.6 A/cm. The current efficiency, however, typically falls off at current densities approximately an order of magnitude less than this, because as the metal ion concentration at the cathode decreases, other electrode reactions begin to predominate. To maintain high current efficiencies, therefore, low current densities are required, which restricts the deposition rate.

In a cathode which is porous or consists of a packed bed of solid objects, the situation is quite different. The surface area is considerably larger than that of a geometrically equivalent flat electrode, and the current density will vary with the surface features of the cathode. The highest current density will be at the sharp points on the surface, while the lowest current density will be in the recesses. Additionally, the diffusion of ions will no longer take place through a layer of uniform thickness. The increased surface area decreases the current density, thereby increasing the current efficiency. Furthermore, if the average pore radius provided by the objects making up the electrode is smaller than the Nernst layer thickness, and the solution can be replenished in the pores, the diffusion path will be shortened to less than the pore radius, and even higher current efficiencies and current densities can be achieved.

Although the above analysis indicates the potential performance improvement that porous or packed bed cathodes offer, the ability of most electrolytes to chemically dissolve back the electrodeposited metal complicates the design of packed bed or porous cathodes Most electrolytes are capable of back dissolution of the constituent metal. Some examples are cadmium cyanide solution, copper etchants, copper nitrate, copper sulfate, and nickel sulfate. The net metal recovered from these types of solutions is the difference between the electrodeposited metal and the metal dissolved back. The rate of back dissolution in acidic solutions, such as sulfates and nitrates, is a function of pH and can be minimized to some extent by pH control during electrolysis.

However, the extremely large surface areas of porous or packed bed cathodes in conjunction with strong liquid-solid contacting results in significant back dissolution of metals. This is further complicated by the fact that the vast majority of current transfer from the cathode to the electrolyte is concentrated at the electrode surface closest to the anode with the current being conducted within the packed bed cathode via object to object conduction. Thus, the current density within the cathode bed is very low. These factors result in a net loss of metal from the interior of the bed due to chemical dissolution. This phenomenon significantly impedes the deposition of metal using packed bed cathodes when the projected bed surface area to volume ratio is small, such as with the system used by Hadzismajlovic et al. mentioned above.

This problem can be ameliorated by using thin or shallow beds as in the FIG. 5 embodiment of the present invention where the projected area to volume ratios are high. The use of a distribution shield allows the spouted bed diameter to be increased without increasing the liquid flow rate. Furthermore, a conical bottom with a shallow slope may be used, which effectively increases the bed projected surface area without increasing the bed volume. When a spouted bed with a shallow bottom, a draft pipe and a distribution shield is used, the objects move radially inward towards the center of the bed, rather than downward as in a conventional spouted bed.

The loading of the parts, particles or other objects can be maintained so that a layer one, two or three objects thick moves inward along the chamber bottom. The liquid-solid contacting is significantly less in this configuration than in conventional spouted beds, since the liquid flows over the moving bed electrode rather than through the bed, as is the case in conventional spouted beds such as the system disclosed by Scott as mentioned above. Additionally, when the bed is shallow, most of the objects receive current from the electrolyte, in contrast to deeper beds where only a small fraction of the objects at the surface of the bed receive current from the electrolyte. These two effects are particularly advantageous for electrolytic recovery of metals from solutions which can chemically dissolve the metal being recovered.

The following examples illustrate the use of the spouted bed cathode in electrowinning applications.

Example 3

Figure 8:
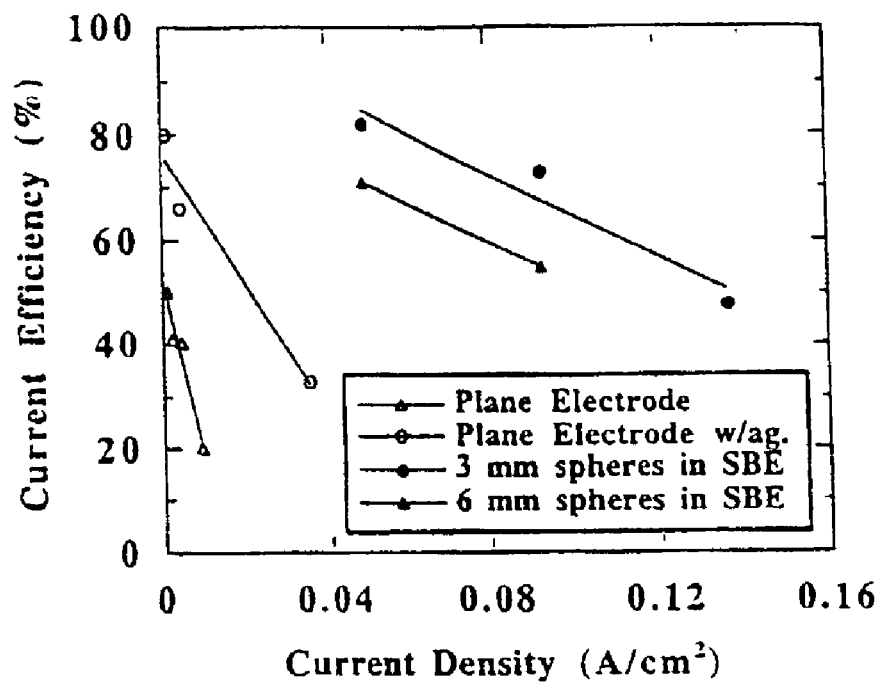
FIG. 8 is a graph showing current efficiency as a function of current density for the electrolytic recovery of silver from a cyanide solution in a spouted bed electrochemical reactor of the invention using 3 mm and 6 mm spheres as compared to using a plane electrode, with and without agitation.

FIG. 8 shows the current efficiency as a function of current density for a spouted bed cathode in a spouted bed reactor. The experiments were conducted using a silver cyanide solution containing 34.1 g K(AgCN)$_2$ and 42.5 g of KCN per gallon. As shown in this figure, the spouted bed cathode comprised either 3 mm diameter spheres or 6 mm diameter spheres, and produced considerably better performance at much higher current densities than a plane electrode without agitation, as well as a plane electrode in a mechanically agitated cell. This means that for the same amount of expended electrical energy, a much greater amount of metal can be removed at a much higher rate.

Figure 9:
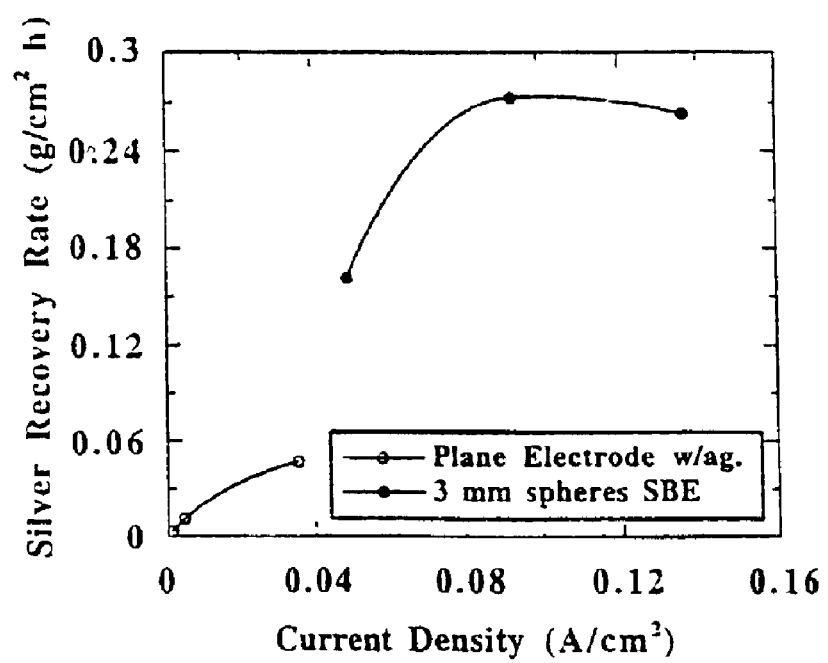
FIG. 9 is a graph showing the silver recovery rate from a cyanide solution as a function of current density in a spouted bed of the invention, as compared to using a plane electrode in an agitated solution; and, FIG. 10 is a graph showing the copper concentration as a function of time for recovery of the metal from a copper sulfate solution at pH 1.9 using a shallow 12" diameter spouted bed reactor of the invention as compared to using a deeper 7.5" spouted bed reactor.

In order to emphasize the considerable increase in recovery rate of the spouted bed cathode, the data in FIG. 8 are replotted in FIG. 9 as the rate of silver recovery from the silver cyanide solution per unit area of cathode material vs. the current density, in order to compare the 3 mm spheres in the spouted bed with the plane electrode exposed to the agitated solution. The rate of metal recovery is calculated by multiplying the current efficiency by the current density and the electrochemical equivalent for silver (4.024 g/A-hr). As shown, the spouted bed recovered metal as much as a factor of six times faster than the plane electrode.

Example 4

Figure 10:
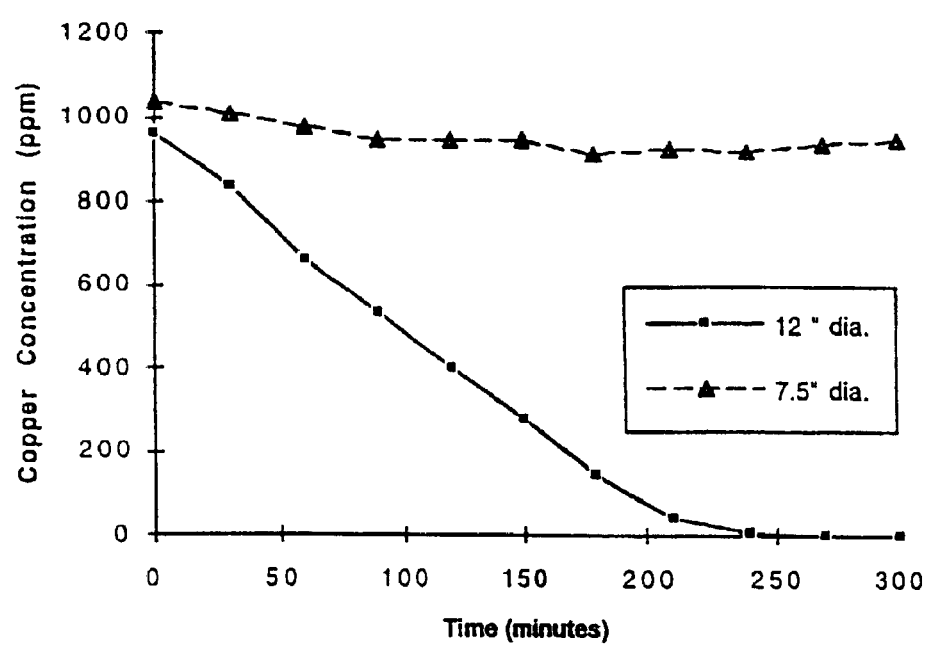

Copper was recovered front copper sulfate solution at pH 1.9 in a spouted bed reactor using a cathode comprising 500 ml of 2 mm diameter metallized glass spheres. One experiment was conducted at 7.5 amperes in a 7.5 inch diameter chamber equipped with a draft pipe and a particle deflector, but no distribution shield. The second experiment was conducted with a 12" diameter chamber equipped with a draft pipe, a particle deflector and a distribution shield. FIG. 10 shows that the 7.5" chamber resulted in almost no reduction in copper concentration while the 12" chamber rapidly recovered copper. This is due to the reduction in back etching when a shallow spouted bed with a distribution shield is used instead of a deeper spouted bed without the shield.

Persons skilled in the art, upon learning of the present disclosure, will recognize that various modifications to the components and elements of the invention are possible without significantly affecting their functions. For example, the specific vessel structure described above may be varied widely in accordance with spouted bed technology, and may have shapes other than cylindrical, such as four sidewalls defining a rectangular chamber and either a single rectangular bottom wall inclined downwardly to the vessel inlet or opposing rectangular bottom walls converging downwardly toward the vessel inlet.

Similarly, the positions of the anode and cathode may be reversed so that metal objects may be polished by having an outer layer removed electrolytically. Furthermore, the apparatus disclosed may be used with a gaseous fluid in combination with a chemical coating composition in order to coat recirculating objects with the chemical composition instead of a metal, thereby providing a spouted bed coating apparatus of the type represented in general by that disclosed in U.S. Pat. No. 5,254,168 issued Oct. 19, 1993, to Littman, et al., the entire contents of this patent being incorporated herein by reference. Accordingly, while the preferred embodiments have been shown and described in detail by way of example, further modifications and embodiments are possible without departing from the scope of the invention as defined by the claims set forth below.

What is claimed is:

1. An apparatus for contacting a plurality of at least partially electrically conductive objects with an electrolytic fluid to coat the objects with a metal in the fluid, said apparatus comprising:

a vessel having at least one bottom wall inclined downwardly from at least one sidewall toward a fluid inlet arranged to provide an upwardly directed stream of said fluid for causing said objects to flow upward from a feed position adjacent to said inlet to a disengaging position at which said objects are disengaged from said stream;

a distribution shield mounted in said vessel and having an upper surface inclined downwardly and extending away from the vicinity of said disengaging position to a return position such that said disengaged objects fall on the upper surface of said distribution shield and move downwardly thereon away from said disengaging position to said return position, said return position being arranged above ail upper portion of said inclined bottom wall to deposit said disengaged objects onto the upper portion of said inclined bottom wall, and said inclined bottom wall being arranged to cause a bed of said deposited objects to move downward along said inclined bottom wall from the upper portion toward said feed position; and a conduit mounted in said vessel and arranged above said fluid inlet for receiving said upward flow of objects, said conduit extending upwardly to confine the flow of said objects from the vicinity of said feed position to the vicinity of said disengaging position; and an electrode positioned to contact said moving bed and a counterelectrode positioned in spaced relation to said moving bed and arranged to contact said fluid, said vessel being partially immersed in said fluid, said counterelectrode being located outside of and in proximity to an immersed portion of said vessel, and said vessel sidewall or bottom wall having at least one opening immersed in said fluid to allow a current flow between said objects and said counterelectrode.

2. An apparatus according to claim 1, wherein said bottom wall has a conical shape and is substantially surrounded by said sidewall, and wherein an upper portion of said distribution shield is connected to an upper portion of said conduit.

3. An apparatus according to claim 1, wherein said conduit confines the flow of said objects from the vicinity of said feed position to at least the vicinity of said distribution shield and is arranged to cause said upward flow of objects to pass through an opening in said distribution shield.

4. An apparatus according to claim 1, wherein said electrode comprises a sheet or layer of electrically conductive material covering at least a portion of said bottom wall and arranged to contact said moving bed of objects.

5. An apparatus according to claim 4, wherein said electrically conductive material is textured to facilitate object movement.

6. An apparatus according to claim 4 furhter comprising an insulating element made of a non-electrically conductive material and arranged to overlap an insulating element made of a non-electrically conductive material and arranged to overlap an upper portion of said sheet or layer, and wherein a gap is provided between said insulating element and the upper portion of said sheet or layer to reduce a density of electrical current in the vicinity of a lower edge of said insulating element.

7. An apparatus according to claim 1, wherein said opening is covered with a porous mesh, cloth or membrane to retain said objects within the vessel.

8. An apparatus according to claim 1, wherein said counterelectode is located under said distribution shield and includes means for preventing said objects from being retained on an upper surface of said counterelectrode.

9. An apparatus according to claim 8 further comprising a deflecting member mounted below said counterelectrode so as to intercept objects carried upward by currents of said fluid and deflect them away from said counterelectrode.

10. An apparatus according to claim 1, wherein said distribution shield and said counterelectrode are detachably suspended in said vessel and are removable to permit internal access to the said vessel.

11. An apparatus according to claim 1, wherein said vessel includes fluid outlet means for discharging said fluid from said vessel; and wherein said apparatus further comprises means for sequentially supplying to said vessel inlet a plurality of fluids each from a corresponding source, and means for returning each of said fluids from said outlet means to said corresponding source from which the fluid was supplied.

12. An apparatus according to claim 11, wherein said sequential supply means comprises means for detachably mounting said vessel sequentially on each of a plurality of containers each of which constitutes the corresponding source of one of said fluids.

13. An apparatus according to claim 12, wherein said sequential supply means further comprises pump means for conveying to said vessel inlet fluid from the container on which said vessel is mounted, control valve means for controlling the flow of fluid from said mounting container to said vessel inlet, and a frame for supporting said vessel, said pump means and said valve means as a portable unit for transfer between said plurality of containers.

14. An apparatus according to claim 13 further comprising detection means for detecting the presence of said vessel in each of said containers, and switch means responsive to said detection means for automatically operating said pump means when said vessel is present in a corresponding one of said containers.

15. An apparatus according to claim 12, wherein said vessel is a portable structure comprising a fitting for connecting said inlet to a conduit for supplying said fluid to said vessel, wherein said mounting means is arranged to detachably support said vessel sequentially on each of said containers, and wherein each of said containers comprises a supply conduit, pump means for pumping fluid from said container to said supply conduit, and valve means for controlling the flow of fluid from said supply conduit to said vessel inlet.

16. An apparatus according to claim 15 further comprising detection means for detecting the presence of said vessel in each of said containers, and switch means responsive to said detection means for automatically operating said pump means when said vessel is present in a corresponding one of said containers.

17. An apparatus according to claim 11 further comprising a supply conduit connected to said vessel inlet, a bypass conduit connected to said supply conduit for recycling at least a portion of the fluid in said supply conduit to the corresponding source, and a control valve for controlling fluid flow in said bypass conduit so as to regulate the amount of fluid flow reaching said vessel inlet.

18. An apparatus according to claim 11, wherein said fluid comprises a liquid and said vessel is open to the atmosphere, and wherein at least a portion of said vessel is immersed in said fluid, and wherein said outlet means comprises at least one opening in an immersed portion of said vessel.

19. An apparatus according to claim 1 further comprising a plurality of containers each for containing a corresponding treating solution to be used in the treating of said objects, pump means for circulating said treating solutions, an inlet manifold for respectively connecting an output of said pump means to each of said containers, an outlet manifold for returning the corresponding solution from an outlet of said vessel to the corresponding container, remotely operable valve means for respectively connecting said inlet manifold and said outlet manifold with one of said containers at a time, and control means for operating said valve means from a location remote therefrom.

20. An apparatus according to claim 1 further comprising a mesh screen positioned relative to said vessel inlet to prevent a discharge of said objects through said vessel inlet in the absence of said fluid stream, and a filter for filtering said fluid upstream of said mesh screen.

21. An apparatus according to claim 1 further comprising a particle trap providing a tortuous flow path upstream of said vessel inlet to prevent a discharge of said objects through said vessel inlet in the absence of said fluid stream.

22. An apparatus according to claim 1 further comprising a deflecting member mounted above said distribution shield and located in the vicinity of said disengaging position so as to intercept said upwardly flowing objects and deflect them away from said fluid stream.

23. An apparatus according to claim 22, wherein said deflecting member has a concave surface for intercepting and deflecting the objects.

24. An apparatus according to claim 1, wherein said bottom wall and said distribution shield are each inclined at an angle in the range of about 20° to about 50° from the horizontal.

25. An apparatus according to claim 1, wherein the fluid in said vessel is a mixture of a liquid and a gas, and wherein said distribution shield has a lower surface which is inclined upwardly away from an intermediate portion of said conduit and toward said sidewall to prevent an accumulation of the gas under said distribution shield.

26. An apparatus according to claim 1, wherein said fluid in said vessel is a mixture of a liquid and a gas, and wherein vent means is provided to prevent an accumulation of the gas under said distribution shield by providing a flow path for said gas from below to above said distribution shield.

27. An apparatus for electrolytically treating a plurality of objects with an electrolytic fluid while immersed in said fluid, said objects being at least partially electrically conductive and said apparatus comprising:

a vessel having at least one bottom wall inclined downwardly from at least one sidewall toward a fluid inlet arranged to provide an upwardly directed stream of said fluid for causing said objects to flow upward from a feed position adjacent to said inlet to a disengaging position at which said objects are disengaged from said stream and from which said disengaged objects are deposited on an upper portion of said bottom wall, said bottom wall being arranged to cause a bed of said objects to move downwardly along said bottom wall away from the upper portion thereof toward said feed position;

an electrode positioned to contact said moving bed and a counterelectrode positioned to contact said fluid, said vessel being at least partially immersed in said fluid, the counterelectrode being located outside of and in proximity to an immersed portion of said vessel, and the sidewall or bottom wall of said vessel having at least one opening immersed in said fluid to allow current a flow between said objects land said counterelectrode;

pump means for conveying said fluid from a container to said vessel inlet;

control valve means for controlling the flow of fluid from said container to said vessel inlet; and a frame for engaging said container and supporting thereon said vessel, said pump means and said valve means to provide a portable unit for transfer between a plurality of containers.

28. An apparatus according to claim 27 further comprising a distribution shield mounted in said vessel and having an upper surface inclined downwardly and extending away from the vicinity of said disengaging position to a return position above the upper portion of said inclined bottom wall, such that said disengaged objects fall on the upper surface of said distribution shield and move downwardly thereon to said return position from which they are deposited onto the upper portion of said inclined bottom wall and move downward along said inclined bottom wall toward said feed position.

29. An apparatus according to claim 28 further comprising a conduit mounted in said vessel and arranged above said fluid inlet for receiving said flow of objects, said conduit extending upwardly to confine the flow of said objects from the vicinity of said feed position to at least the vicinity of said distribution shield and being arranged to cause said upward flow of objects to pass through an opening in said distribution shield.

30. An apparatus according to claim 28, wherein said distribution shield is detachably suspended in said vessel and is removable to permit internal access to said vessel.

31. An apparatus according to claim 28 further comprising a deflecting member mounted above said distribution shield and located in the vicinity of said disengaging position so as to intercept said upwardly flowing objects and deflect them away from said fluid stream.

32. An apparatus according to claim 27, wherein said opening is covered with a porous mesh, cloth or membrane to retain said objects with the vessel.

33. An apparatus according to claim 27, wherein said electrode comprises a sheet or layer of electrically conductive material covering a portion of said bottom wall and arranged to contact said moving bed of objects.

34. An apparatus according to claim 33, wherein said electrically conductive matrial is textured to facilitate object movement.

35. An apparatus according to claim 33 further comprising an insulating element made on non-electrically conductive material and arranged to overlap an upper portion of said sheet or layer, and wherein a gap is provided between said insulating element and the upper portion of said sheet or layer to reduce a density of electrical current in the vicinity of a lower edge of said insulating element.

36. An apparatus for contacting a plurality of objects with a fluid, said apparatus comprising:
  a vessel having at least one bottom wall inclined downwardly from at least one sidewall toward a fluid inlet arranged to provide an upwardly directed stream of said fluid for causing said objects to flow upward from a feed position adjacent to said inlet to a disengaging position. at which said objects are disengaged from said stream;
  a distribution shield mounted in said vessel and having an upper surface inclined downwardly and extending away from the vicinity of said disengaging position to a return position such that said disengaged objects fall on the upper surface of said distribution shield and move downwardly thereon away from said disengaging position to said return position, said return position being arranged above an upper portion of said inclined bottom wall to deposit said disengaged objects onto the upper portion of said inclined bottom wall, and said inclined bottom wall being arranged to cause a bed of said deposited objects to move downward along said inclined bottom wall from the upper portion toward said feed position; and,
  an electrode arranged to contact said moving bed and a counterelectrode arranged to contact said fluid, said fluid being a liquid electrolyte comprising a metal for coating said objects and said objects being at least partially electrically conductive, said vessel being at least partially immersed in said fluid and said counterelectrode being located outside of and in proximity to an immersed portion of said vessel, and the sidewall or bottom wall of said vessel having at least one opening immersed in said fluid to allow current to flow between said objects and said counterelectrode.

37. An apparatus for contacting a plurality of objects with a fluid, said apparatus comprising:
  a vessel having at least one bottom wall inclined downwardly from at least one sidewall toward a fluid inlet arranged to provide an upwardly directed stream of said fluid for causing said objects to flow upward to a disengaging position from a feed position adjacent to said inlet;
  a deflecting member located in the vicinity of said disengaging position for intercepting and disengaging said upwardly flowing objects from said fluid stream;
  a distribution shield mounted in said vessel and having an upper surface inclined downwardly and extending away from the vicinity of said disengaging position to a return position such that said disengaged objects fall on the upper surface of said distribution shield and move downwardly thereon away from said disengaging position to said return position, said return position being arranged above an upper portion of said inclined bottom wall to deposit said disengaged objects onto the upper portion of said inclined bottom wall, and said inclined bottom wall being arranged to cause a bed of said deposited objects to move downward along said inclined bottom wall from the upper portion toward said feed position; and,
  an electrode arranged to contact said moving bed and a counterelectrode aarranged to contact said fluid, said fluid being an electrolyte comprising a metal for coating said objects and said objects being at least partially electrically conductive, said vessel being at least partially immersed in said fluid and said counterelectrode being located outside of and in proximity to an immersed portion of said vessel, and the sidewall or bottom wall of said vessel having at least one opening immersed in said fluid to allow current a flow between said objects and said counterelectrode.

38. An apparatus according to claim 37 further comprising a conduit mounted in said vessel and arranged above said fluid inlet for receiving said flow of objects, said conduit extending upwardly to confine the flow of said objects from the vicinity of said feed position to at least the vicinity of said distribution shield and being arranged to cause said upward flow of objects to pass through an opening in said distribution shield.

* * * * *

UNITED STATES PATENT AND TRADEMARK OFFICE
CERTIFICATE OF CORRECTION

PATENT NO. : 6,936,142 B2
DATED : August 30, 2005
INVENTOR(S) : Hradil et al.

It is certified that error appears in the above-identified patent and that said Letters Patent is hereby corrected as shown below:

<u>Column 2,</u>
Line 26, should read -- cathodes with anodes suspended above the spouted bed --.
Lines 59 and 60, delete the blank space between "the" and "objects".

<u>Column 3,</u>
Line 21, should read -- incorporate a liquid by-pass circuit and adjustment valve so --.

<u>Column 5,</u>
Lines 11 and 12, delete the blank space between "the" and "parts".
Line 40, should read -- apparatus as modified to provide a self-contained portable --.

<u>Column 15,</u>
Line 59, should read -- being arranged above an upper portion of said inclined --.

Signed and Sealed this

Twenty-first Day of March, 2006

JON W. DUDAS
*Director of the United States Patent and Trademark Office*